July 23, 1963
K. K. KENNEPOHL
3,098,386
LIQUID LEVEL INDICATOR FOR L.P. GAS TANKS
Filed Nov. 17, 1961
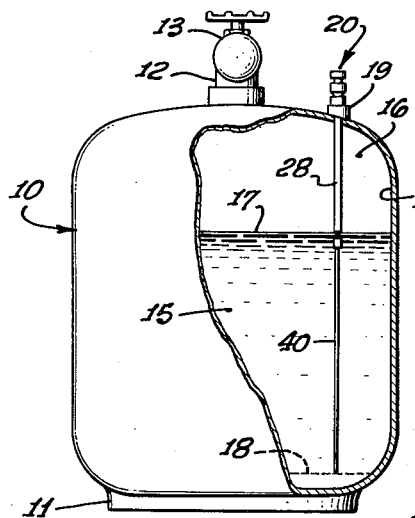
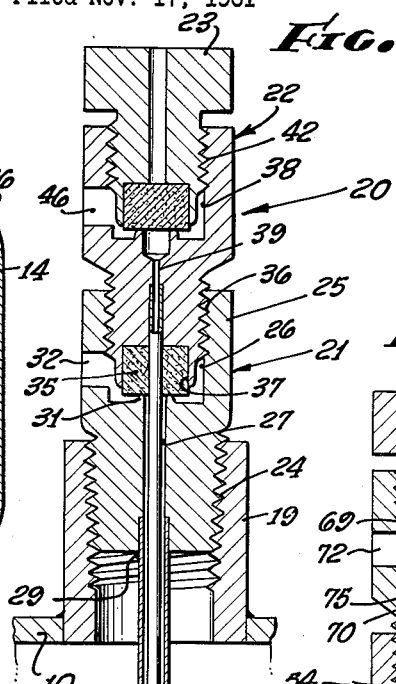
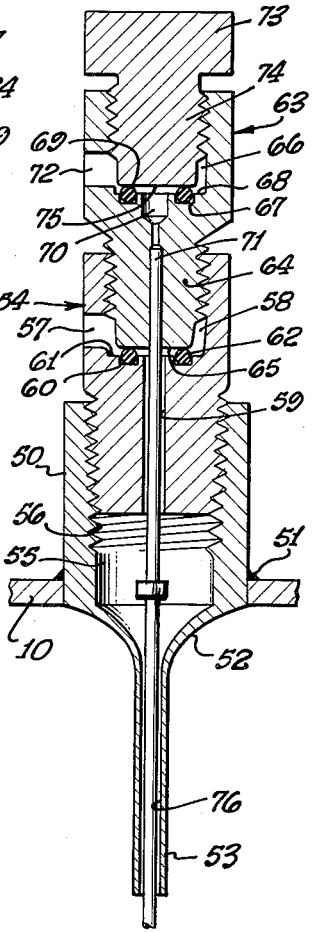
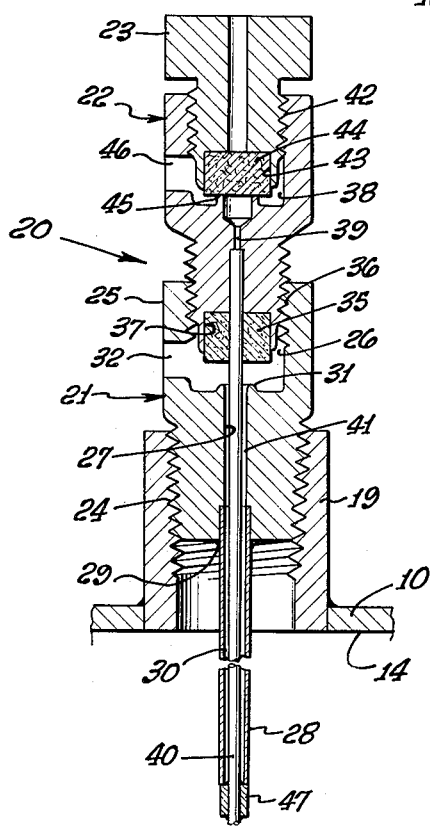
INVENTOR.
KENNETH K. KENNEPOHL
BY
Beehler & Shanahan
ATTORNEYS.

United States Patent Office 3,098,386
Patented July 23, 1963

3,098,386
LIQUID LEVEL INDICATOR FOR L. P. GAS TANKS
Kenneth K. Kennepohl, 44073 N. Sierra Highway, Lancaster, Calif.
Filed Nov. 17, 1961, Ser. No. 153,123
4 Claims. (Cl. 73—297)

The invention relates to liquid level indicators and more particularly a type of liquid level indicator which is especially useful in detecting liquid levels in a liquid petroleum gas tank frequently identified as an L. P. gas tank.

It is commonly appreciated that liquid petroleum gas tanks for the storage and dispensing of butane, propane and related types of liquid petroleum gas customarily store gas in a liquid form but wherein only a portion of the tank is devoted to the storage of the liquid gas, leaving an upper portion of the tank in which gas accumulates under a considerable pressure available for distribution into an appropriate gas line.

Gas tanks of this kind are individual tanks rarely manifolded, each tank serving an individual installation such as a trailer, dwelling house, or some special burning or consuming apparatus. Normally L.P. gas systems are used in isolated circumstances where customary conventional gas supplies are not available and where the user must depend upon its own observation to be aware of when the tank needs to be replenished. Moreover, since replenishment of tanks of this kind should for safety purposes be a professional operation rather than by an individual inexperienced user, it is important for the user to be aware when replenishment is needed so that there will be ample time and opportunity to secure a replenishment before the supply entirely fails.

It is therefore among the objects of the invention to provide a new and improved liquid level indicator of a simple, direct and positive type which is especially advantageous for use on liquid petroleum gas supply tanks.

Another object of the invention is to provide a new and improved liquid level indicator for liquid petroleum gas tanks which is of such construction and design that it can be inserted into a fitting already in place on the tank, without changes being needed in the fitting to make it completely operative.

Another object of the invention is to provide a new and improved liquid level indicator for liquid petroleum gas tanks and tanks of related character which is rugged, which is relatively inexpensive in design and construction, and which moreover is of such character that it is exceptionally dependable for safe use.

Still another object of the invention is to provide a new and improved liquid level indicator of a compact type, the parts of which can be inexpensively constructed in a fashion such as to assure their fitting together properly, which occupies a relatively minimum amount of space at the top of the tank, and which, if desired, can be arranged so as to detect liquid level at all stages between a full and a condition where replenishment is immediately needed.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:
FIGURE 1 is a side elevational view of a typical liquid petroleum gas tank installation partly broken away to show the liquid level indicator in place.

FIGURE 2 is a longitudinal sectional view of the liquid level indicator assembled and in position upon a tank showing the indicator in closed position.

FIGURE 3 is a longitudinal sectional view similar to FIGURE 2 but showing the liquid level indicator opened to detect full condition of the tank.

FIGURE 4 is a longitudinal sectional view showing a slightly modified form of the liquid level indicator in a closed position of adjustment.

In the form of invention chosen for the purpose of illustration there is shown a tank 10 having a base 11 and at the top of which is a supply fitting 12 equipped with a shut-off valve 13. Within the tank is a chamber 14 which accommodates a reservoir 15 of liquid petroleum gas in liquid form above which is a gas reservoir 16.

As shown in the drawing the tank is full inasmuch as a liquid level 17 is at the position which would prevail when the maximum amount of liquid petroleum gas in liquid condition has been supplied to the tank. A dotted line 18 indicates the level of the liquid when the tank is for all practical purposes empty to the point where a refill is needed.

In order to provide means for the employment of a liquid level indicator in the tank, most commercial tanks are provided with a standard one-quarter inch pipe thread female fitting 19 located at the top of the tank, providing access to the interior of the tank, namely, the chamber 14. The liquid level indicator herein disclosed comprises an assembly indicated generally by the reference character 20 of such nature that it can preferably be threadedly engaged with the fitting 19.

More particularly the assembly 20 comprises an inner high level fitting 21, an outer low level fitting 22 and a closure plug 23. The high level fitting 21 has an exteriorly threaded portion 24 which is adapted to threadedly engage the one-quarter inch pipe fitting 19, as illustrated in FIGURE 3. An outer portion 25 of the fitting 21 is provided with a recess 26, the recess being interiorly threaded. A high level passage 27 communicates between the recess 26 and the lower end of the fitting. A high level tube 28 is fastened in the lower end of the high level fitting as, for example, by solder 29 so that it is a fixed, sealed and permanent part of the high level fitting. An interior passage 30 in the high level tube therefore communicates with the high level passage 27 and, under certain circumstances, with the recess 26.

A high level vent passage 32 extends laterally outwardly from the recess 26 and forms a communication between the recess and the exterior. Normally communication between the passage 30 and the high level vent passage 32 is closed by pressure of a sealing washer 35 impressed upon the sealing seat 31.

The outer low level fitting 22 in turn is provided with an exteriorly threaded portion 36 which is adapted to threadedly engage the interiorly threaded recess 26. A pocket 37 at the lower end of the low level fitting is provided for reception of the sealing washer 35 previously described.

Within the low level fitting is a recess 38 interiorly threaded in the same manner as the recess 26. A low level passage 39 extends downwardly from the recess 38 through the lower portion of the low level fitting and a low level tube 40 is affixed to the lower end of the fitting 22 and sealed therein by appropriate means. The low level tube extends downwardly through the sealing washer 35, thence through the high level passage 27 and through the high level tube 28. The outside diameter of the tube 40 is substantially smaller than the inside diameter of the passage 27 and the passage 38, thereby to provide an annular high level vent clearance 41.

The closure plug 23 has an exteriorly threaded portion 42 provided with a pocket 43 in which is located a sealing washer 44. An annular sealing seat 45 surrounding the passage 39 is adapted to accommodate the sealing washer 44 so that an effective leak-proof seal can be established by employment of the sealing washer. A low level vent passage 46 is in communication between the exterior of the fitting 22 and the recess 38.

In one form of the device, as illustrated in FIGURE 2, there is provided a collar 47 anchored to the tube 40 at a location such that when the fitting 22 is unscrewed, the collar will be drawn into contact with the lower edge of the tube 48.

In operation the closure plug 23 and the fittings are normally screwed into position, as illustrated in FIGURE 2. When it becomes desirable to determine when the tank has been filled to about the liquid level 17 indicating a satisfactory full condition of the tank, the fitting 22 is unscrewed to the position shown in FIGURE 3. Unscrewing the fitting as shown raises the sealing washer 35 clear of the sealing seat 31 under which condition the vent 32 is in communication through the recess 26 and passage 30 with the chamber 14. While the tank is being filled, gas within the tank will pass to the high level vent passage 32.

After liquid finally reaches the level 17 which is the level at the bottom of the tube 28, the flow of gas will cease and be replaced by flow of liquid outwardly of the vent passage 32. When this condition occurs, it will be an indication that the tank is full enough, namely, full to the level 17 and further filling is stopped. The fitting 22 at this point is screwed into the fitting 21 until the sealing washer 35 is again seated upon the sealing seat 31, thereby to shut off further outflow of liquid.

As liquid continues to be used in the normal course of employment of the tank by being vaporized and then passed outwardly through the valve 13, the liquid level in the tank will gradually lower. At any time the assembly may be employed to determine whether or not the liquid level has passed to a location as low as the refill level 18. This is accomplished by unscrewing the closure plug 23, thereby to elevate the sealing washer 44 to a location removed from the sealing seat 45 under which circumstance the low level vent passage 40 will be placed in communication through the recess 38 with the passage 39 and the interior of the tube 40 with the chamber 14 of the tank.

When the closure plug is loosened, as described, before the liquid level in the tank reaches the level 18 at the lowermost end of the tube 40, liquid will be forced outwardly of the high level vent passage 46.

When liquid finally lowers to any point below the level 18, gas which has been formed in the chamber 14 in the usual course of operation will then flow outwardly of the low level vent passage 46 instead of liquid and when this occurs, it will signal the operator that the liquid level in the tank is so low that replenishment is needed.

By limiting opening of the low level fitting 22 through engagement of the collar 47 with the tube 28, the fitting 22 can never be entirely removed. There is no particular need to limit outward movement of the closure plug 23.

In the form of the invention illustrated in FIGURE 4, the tank is provided with a fitting 50 secured to the tank by means of a weld 51. The fitting includes a sloping bottom 52 terminating in a high level tube 53. A high level fitting 54 is threadedly engaged in a threaded recess 55, threads 56 being pipe threads. A high level vent passage 57 communicates with a chamber 58 and this chamber in turn communicates with a high level vent clearance 59 in one condition of adjustment. In this form of device, an annular recess 60 is provided in a bottom 61 of the chamber 58 and an O ring 62 is contained within the recess in order to form a seal when the fitting is closed.

A low level fitting 63 has an extension 64 in threaded engagement with the interior of the chamber 58. A relatively flat inner surface 65 acts as a sealing surface or seat and in closed position makes a pressure tight engagement with the O ring 62.

In the low level fitting is a chamber 66 having an annular recess 67 in a bottom 68 within which an O ring 69 is positioned. The chamber in one condition of adjustment is in communication with a low level passage 70 which communicates with a low level tube 71. A low level vent passage 72 forms an outlet from the chamber 66.

To close the low level passage, there is provided a plug 73 having an extension 74 in threaded engagement within the interior of the chamber 66. To effectively seal this portion of the device, a sealing surface 75 at the interior end of the extension 74 is adapted to engage the O ring 70 in pressure tight engagement.

Although the O rings and recesses have been described as being located in the bottoms of the recesses in each instance it will be appreciated that under some circumstance a reversal of this arrangement might be preferred wherein the O rings and seals are located in the respective sealing surfaces of the extensions.

As in the first described form of the invention, a passageway 76 within the tube 53 always remains clear inasmuch as the low level tube 71 is appreciably smaller in diameter than the passage. The high level liquid condition is detected in the same fashion as previously described by unscrewing the fitting 63 thereby to interconnect the high level vent passage 57 with the passage 76. In the same fashion, a low level condition can be detected by unscrewing the plug 73 thereby placing the low level vent passage 72 in communication with the low level tube 71.

From the description and the accompanying drawings it will be understood that the fittings 21 and 22 and also the closure plug 23 may all be constructed from bar stock of the same outside diameter and that the outside diameter of this stock can be at least as small and perhaps smaller than the outside diameter of the fitting 19. The threaded portions are concentric and the fittings are short and in such arrangement that they present only a relatively short assembled length when screwed together as shown. The indicator assembly, moreover, can be assembled as complete assembly together with the telescoping tubes and the entire assembly inserted into the fitting 19 which is standard in the tank, thereby making it possible to use the indicator assembly with standard equipment without change and without the necessity of supplying special parts, tools, or equipment. Further, by reason of there needing to be but a very short movement to unseat the sealing washers, the device is easy to operate while at the same time dependable and of such character that the high level and low level of liquid in the tank can be quickly and easily determined. Should it be desirable levels between high and low levels can be detected with certainty, using a form of the invention wherein the collar 47 is omitted, or placed near the lower end of the tube.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In an L. P. gas tank having a chamber in the tank and an indicator passage from the chamber to the exterior, an indicator comprising an inner high level fitting having a high level passage therethrough, and a connection at one end adapted to engage said tank at the indicator passage, said fitting having a threaded portion at the other end and a high level vent passage in communication with the exterior, a high level tube extending from said one end of the fitting to an upper level of said chamber, an outer low level fitting having a low level passage therethrough, threads at one end engageable with the high level fitting, a seal between the low level fitting and the high level fitting adapted to close said high level passage in the high level fitting, a low level tube extending from said one end of the low level fitting telescopingly through said high level tube and providing a vent clearance therebetween, said low level fitting having a threaded portion at the other end and a transverse low level vent passage in communication with the exterior, a closure plug in threaded engagement with said low level fitting, a seal between the plug and the low level fitting normally sealing said low level tube, said closure plug being partially releasable to indicate a low level tank condition by gas flow through said low level vent passage, said high level fitting being partially releasable to indicate a high level tank condition by liquid flow through said high level vent passage.

2. In an L. P. gas tank having a chamber in the tank and an indicator passage from the chamber to the exterior, an indicator comprising an inner high level fitting having a high level passage therethrough, and a connection at one end adapted to engage said tank at the indicator passage, said fitting having an internally threaded recess at the other end and a transverse high level vent passage in communication between said recess and the exterior and a high level tube in communication with the recess and extending from said one end of the fitting to an upper level of said chamber, an outer low level fitting having a low level passage therethrough, external threads at one end engageable in the recess in the high level fitting, a seal therein adapted to close said high level passage in the high level fitting, a low level tube extending from said one end of the low level fitting telescopingly through said high level tube and providing a vent clearance therebetween said low level fitting having an internally threaded recess at the other end and a transverse low level vent passage in communication between said last recess and the exterior, an externally threaded closure plug in threaded engagement with said last recess, said plug having a seal therein normally sealing said low level tube, a stop collar on said low level tube engageable with said high level tube at open position of the low level fitting to prevent disassembly of said indicator, said closure plug being partially releasable to indicate a low level tank condition by gas flow through said low level vent passage, said high level fitting being partially releasable to indicate a high level tank condition by liquid flow through said high level vent passage.

3. In an L. P. gas tank having a standard internally threaded nut at a top wall with a central passage therethrough in communication between a chamber in the tank and the interior, a liquid level indicator comprising an inner high level fitting having a high level passage therethrough and external threads at one end adapted to engage said nut, said fitting having an internally threaded recess at the other end and a transverse high level vent passage in communication between said recess and the exterior, a high level tube in communication with the recess and extending from said one end of the fitting to an upper level of said chamber, an outer low level fitting having a low level passage therethrough, external threads at one end engageable in the recess in the high level fitting, a pocket at said one end having a sealing washer therein adapted to close said high level passage in the high level fitting, a low level tube extending from said one end of the low level fitting telescopingly through said high level tube and providing a vent clearance therebetween, said low level fitting having an internally threaded recess at the other end and a transverse low level vent passage in communication between said last recess and the exterior, an externally threaded closure plug in threaded engagement with said last recess, said plug having a pocket and sealing washer therein normally sealing said low level tube, a stop collar on said low level tube engageable with said high level tube at open position of the low level fitting to prevent disassembly of said low level fitting, said closure plug being partially releasable to indicate a low level tank condition by gas flow through said low level vent passage, said high level fitting being partially releasable to indicate a high level tank condition by liquid flow through said high level vent passage.

4. In an L. P. gas tank a chamber in the tank and an indicator passage from the chamber to the exterior, an indicator comprising an inner high level fitting having a high level passage therethrough, and a connection at one end adapted to engage said tank at the indicator passage, said fitting having an internally threaded recess at the other end and a transverse high level vent passage in communication between said recess and the exterior and a high level tube in communication with the recess and extending from said one end of the fitting to an upper level of said chamber, an outer low level fitting having a low level passage, therethrough, external threads at one end engageable in the recess in the high level fitting, a packing washer therein adapted to close said high level passage in the high level fitting, a low level tube extending from said one end of the low level fitting through the packing washer and said high level fitting, said low level fitting having an internally threaded recess at the other end and a transverse low level vent passage in communication between said last recess and the exterior, an externally threaded closure plug in threaded engagement with said last recess, said plug having a packing washer therein normally sealing said low level tube, a stop collar on said low level tube engageable with said high level tube at open position of the low level fitting to prevent disassembly of said indicator, said closure plug being partially releasable to indicate a low level tank condition by gas flow through said low level vent passage, said high level fitting being partially releasable to indicate a high level tank condition by liquid flow through said high level vent passage.

References Cited in the file of this patent

UNITED STATES PATENTS

| | | |
|---|---|---|
| 2,450,142 | Holicer | Sept. 28, 1948 |
| 2,511,649 | Reiter | June 13, 1950 |